US 8,652,006 B2

(12) United States Patent
Hansen

(10) Patent No.: US 8,652,006 B2
(45) Date of Patent: Feb. 18, 2014

(54) METHOD AND APPARATUS FOR OPERATING A POWERTRAIN SYSTEM UPON DETECTING A STUCK-CLOSED CLUTCH

(75) Inventor: R. Anthony Hansen, Redford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/460,892

(22) Filed: May 1, 2012

(65) Prior Publication Data

US 2013/0296133 A1   Nov. 7, 2013

(51) Int. Cl.
*B60W 10/02* (2006.01)
*B60W 10/08* (2006.01)

(52) U.S. Cl.
USPC .............................. 477/107; 477/5; 477/906

(58) Field of Classification Search
None
See application file for complete search history.

(56) References Cited

U.S. PATENT DOCUMENTS

| | | | |
|---|---|---|---|
| 6,953,409 B2 | 10/2005 | Schmidt et al. | |
| 7,285,071 B2 * | 10/2007 | Nakajima et al. | 477/107 |
| 7,645,206 B2 | 1/2010 | Holmes et al. | |
| 7,867,135 B2 * | 1/2011 | Wu et al. | 477/5 |
| 8,357,074 B2 * | 1/2013 | Wu et al. | 477/5 |
| 8,439,798 B2 * | 5/2013 | Hanyu et al. | 477/45 |
| 2006/0040791 A1 * | 2/2006 | Nakajima et al. | 477/111 |
| 2008/0194379 A1 * | 8/2008 | Steinborn et al. | 477/5 |
| 2011/0021313 A1 * | 1/2011 | Steinborn et al. | 477/5 |

OTHER PUBLICATIONS

U.S. Appl. No. 13/460,906, Hansen, et al.

* cited by examiner

*Primary Examiner* — David D Le
*Assistant Examiner* — Steven B Christ

(57) ABSTRACT

A powertrain system includes a multi-mode transmission having a plurality of torque machines. A method for controlling the powertrain system includes identifying all presently applied clutches including commanded applied clutches and the stuck-closed clutch upon detecting one of the torque-transfer clutches is in a stuck-closed condition. A closed-loop control system is employed to control operation of the multi-mode transmission accounting for all the presently applied clutches.

8 Claims, 4 Drawing Sheets

METHOD AND APPARATUS FOR OPERATING A POWERTRAIN SYSTEM UPON DETECTING A STUCK-CLOSED CLUTCH

GOVERNMENT CONTRACT RIGHTS

This invention was made with U.S. Government support under Agreement No. DE-FC26-08NT04386 awarded by the U.S. Department of Energy The U.S. Government may have certain rights in this invention.

TECHNICAL FIELD

This disclosure is related to dynamic system controls for powertrain systems employing multiple torque-generative devices.

BACKGROUND

The statements in this section merely provide background information related to the present disclosure. Accordingly, such statements are not intended to constitute an admission of prior art.

Powertrain systems may be configured to transmit torque originating from multiple torque-generative devices through a transmission device to an output member that may be coupled to a driveline. Such powertrain systems include hybrid powertrain systems and extended-range electric vehicle systems. Control systems for operating such powertrain systems operate the torque-generative devices and apply torque transfer elements in the transmission to transfer torque in response to operator-commanded output torque requests, taking into account fuel economy, emissions, driveability, and other factors. Exemplary torque-generative devices include internal combustion engines and non-combustion torque machines. The non-combustion torque machines may include electric machines that are operative as motors or generators to generate a torque input to the transmission independently of a torque input from the internal combustion engine. The torque machines may transform vehicle kinetic energy transferred through the vehicle driveline to electrical energy that is storable in an electrical energy storage device in what is referred to as a regenerative operation. A control system monitors various inputs from the vehicle and the operator and provides operational control of the hybrid powertrain, including controlling transmission operating state and gear shifting, controlling the torque-generative devices, and regulating the electrical power interchange among the electrical energy storage device and the electric machines to manage outputs of the transmission, including torque and rotational speed.

Known transmission devices employ torque-transfer clutch devices to transfer torque between the engine, the torque machines and the driveline. Operation of a powertrain system includes activating and deactivating the clutches to effect operation in selected operating states. A clutch or a clutch activation system, e.g., a hydraulic circuit, may experience a fault that causes a clutch to stick in a stuck-open state or a stuck-closed state. Such a fault may be transient or permanent.

SUMMARY

A powertrain system includes a multi-mode transmission having a plurality of torque machines. A method for controlling the powertrain system includes identifying all presently applied clutches including commanded applied clutches and the stuck-closed clutch upon detecting one of the torque-transfer clutches is in a stuck-closed condition. A closed-loop control system is employed to control operation of the multi-mode transmission accounting for all the presently applied clutches.

BRIEF DESCRIPTION OF THE DRAWINGS

One or more embodiments will now be described, by way of example, with reference to the accompanying drawings, in which.

DETAILED DESCRIPTION

Figure 1:
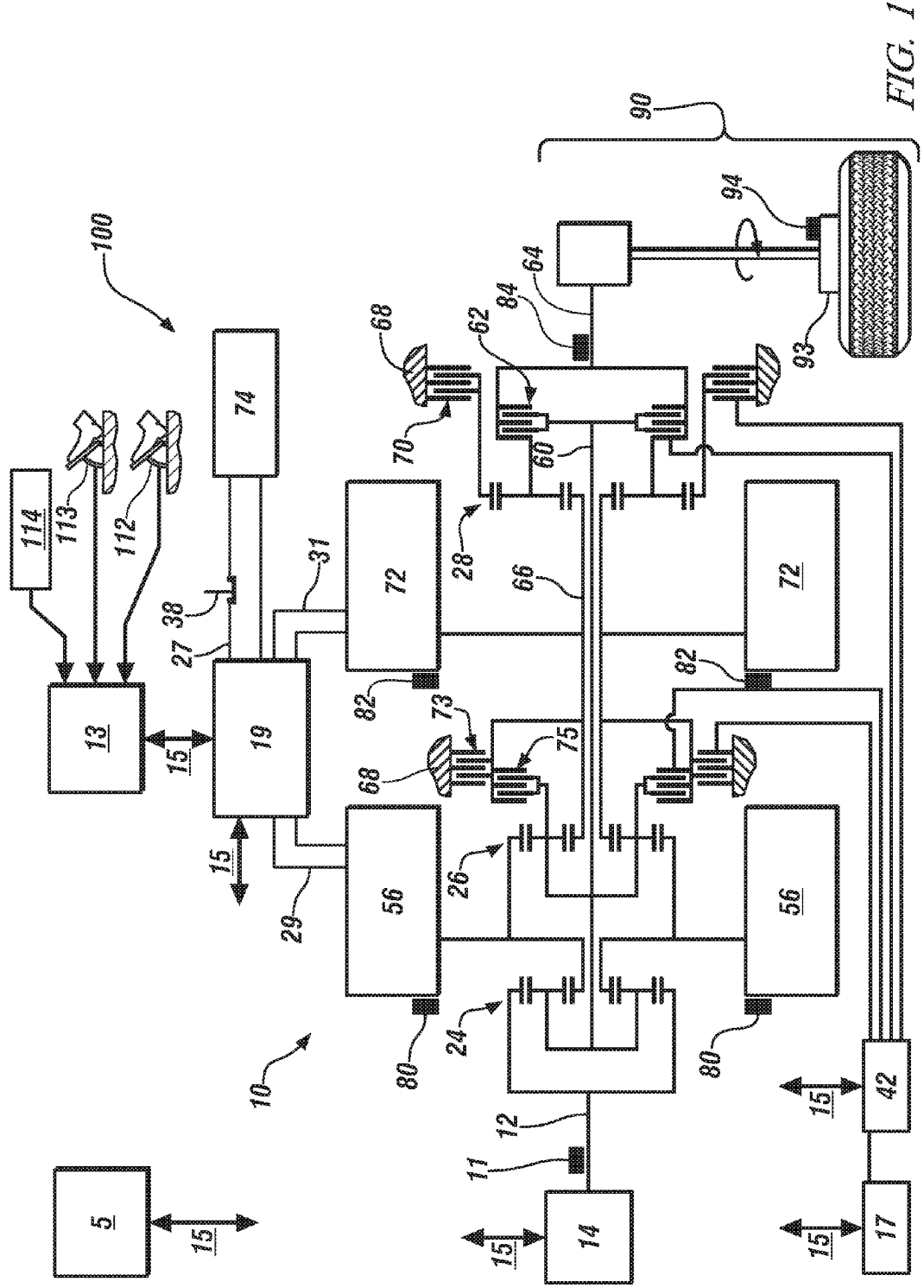
FIG. 1 illustrates a powertrain system including an internal combustion engine, an electro-mechanical transmission, a driveline, and a controller in accordance with the disclosure.

Referring now to the drawings, wherein the showings are for the purpose of illustrating certain exemplary embodiments only and not for the purpose of limiting the same, FIG. 1 depicts a powertrain system 100 that includes an internal combustion engine (engine) 14, a multi-mode electro-mechanical transmission (transmission) 10, a driveline 90, and a controller 5. The transmission 10 mechanically couples to the engine 14 and includes first and second torque machines 56 and 72, which are electric motor/generators in one embodiment. The engine 14 and first and second torque machines 56 and 72 each generate torque that can be transferred to the transmission 10.

The engine 14 may be any suitable combustion device, and includes a multi-cylinder internal combustion engine selectively operative in several states to transfer torque to the transmission 10 via an input member 12, and can be a spark-ignition or a compression-ignition engine. The engine 14 includes a crankshaft operatively coupled to the input member 12 of the transmission 10. A rotational speed sensor 11 monitors rotational speed of the input member 12. Power output from the engine 14, i.e., rotational speed and engine torque, can differ from the input speed and the input torque to the transmission 10 due to placement of torque-consuming components on the input member 12 between the engine 14 and the transmission 10, e.g., a torque management device.

The illustrated transmission 10 is a two-mode, compound-split, electro-mechanical transmission 10 that includes three planetary-gear sets 24, 26 and 28, and four engageable torque-transferring devices, i.e., clutches C1 70, C2 62, C3 73, and C4 75. Other multi-mode transmissions may instead be employed. As used herein, clutches refer to torque transfer devices that can be selectively applied in response to a control signal, and may be any suitable devices including by way of example single or compound plate clutches or packs, one-way clutches, band clutches or brakes. A hydraulic circuit 42 is configured to control clutch states of each of the clutches, with pressurized hydraulic fluid supplied by an electrically-powered hydraulic pump 17 that is operatively controlled by the controller 5. Clutches C2 62 and C4 75 are hydraulically-applied rotating friction clutches. Clutches C1 70 and C3 73 are hydraulically-controlled brake devices that can be grounded to a transmission case 68. Each of the clutches C1 70, C2 62, C3 73, and C4 75 is hydraulically applied using pressurized hydraulic fluid supplied by the hydraulic control circuit 42 in this embodiment. The hydraulic circuit 42 is operatively controlled by the controller 5 to activate and deactivate the aforementioned clutches, provide hydraulic fluid for cooling and lubricating elements of the transmission, and provide hydraulic fluid for cooling the first and second torque machines 56 and 72. Hydraulic pressure in the hydraulic circuit 42 may be determined by measurement using pressure sensor(s), by estimation using on-board algorithms, or using other suitable methods.

The first and second torque machines 56 and 72 are three-phase AC motor/generator machines, each including a stator and a rotor, and respective resolvers 80 and 82. The motor stator for each machine is grounded to an outer portion of the transmission case 68, and includes a stator core with coiled electrical windings extending therefrom. The rotor for the first torque machine 56 is supported on a hub plate gear that is operatively attached to shaft 60 via the second planetary gear set 26. The rotor for the second torque machine 72 is fixedly attached to a sleeve shaft hub 66. Each of the resolvers 80 and 82 is signally and operatively connected to a transmission power inverter control module (TPIM) 19, and each senses and monitors rotational position of the resolver rotor relative to the resolver stator, thus monitoring rotational position of respective ones of first and second torque machines 56 and 72. Additionally, the signals output from the resolvers 80 and 82 may be used to determine rotational speeds for first and second torque machines 56 and 72.

The transmission 10 includes an output member 64, e.g. a shaft, which is rotatably connected to the driveline 90 to provide output power to the driveline 90 that is transferred to vehicle wheels 93, one of which is shown in FIG. 1. The output power at the output member 64 is characterized in terms of an output rotational speed and an output torque. A transmission output speed sensor 84 monitors rotational speed and rotational direction of the output member 64. Each of the vehicle wheels 93 is preferably equipped with a wheel speed sensor 94 adapted to monitor wheel speed to determine vehicle speed, and absolute and relative wheel speeds for braking control, traction control, and vehicle acceleration management.

The input torque from the engine 14 and the motor torques from the first and second torque machines 56 and 72 are generated as a result of energy conversion from fuel or electrical potential stored in an electrical energy storage device (ESD) 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 preferably includes a pair of power inverters and respective motor control modules configured to receive torque commands and control inverter states therefrom for providing motor drive or regeneration functionality to meet the motor torque commands. The power inverters include complementary three-phase power electronics devices, and each includes a plurality of insulated gate bipolar transistors for converting DC power from the ESD 74 to AC power for powering respective ones of the first and second torque machines 56 and 72 by switching at high frequencies. The insulated gate bipolar transistors form a switch mode power supply configured to receive control commands. There is a pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second torque machines 56 and 72 for operation as motors or generators via transfer conductors 29 and 31 respectively.

The TPIM 19 transfers electrical power to and from the first and second torque machines 56 and 72 through the pair of power inverters and respective motor control modules in response to the motor torque commands. Electrical current is transmitted to and from the ESD 74 in accordance with whether the ESD 74 is being charged or discharged.

The controller 5 signally and operatively links to various actuators and sensors in the powertrain system 100 via a communications link 15 to monitor and control operation of the powertrain system 100, including synthesizing information and inputs, and executing routines to control actuators to meet control objectives related to fuel economy, emissions, performance, drivability, and protection of hardware, including batteries of ESD 74 and the first and second torque machines 56 and 72. The controller 5 is a subset of an overall vehicle control architecture, and provides coordinated system control of the powertrain system 100. The controller 5 may include a distributed control module system that includes individual control modules including a supervisory control module, an engine control module, a transmission control module, a battery pack control module, and the TPIM 19. A user interface 13 is preferably signally connected to a plurality of devices through which a vehicle operator provides an output torque request that is employed by the controller 5 to direct and command operation of the powertrain system 100. The devices preferably include an accelerator pedal 113, an operator brake pedal 112, a transmission range selector 114 (PRNDL), and a vehicle speed cruise control. The transmission range selector 114 may have a discrete number of operator-selectable positions, including the rotational direction of the output member 64 to enable one of a forward and a reverse direction. The user interface 13 may include a single device, as shown, or alternatively may include a plurality of user interface devices directly connected to individual control modules.

The aforementioned control modules communicate with other control modules, sensors, and actuators via the communications link 15, which effects structured communication between the various control modules. The specific communication protocol is application-specific. The communications link 15 and appropriate protocols provide for robust messaging and multi-control module interfacing between the aforementioned control modules and other control modules providing functionality including e.g., antilock braking, traction control, and vehicle stability. Multiple communications buses may be used to improve communications speed and provide some level of signal redundancy and integrity, including direct links and serial peripheral interface (SPI) buses. Communication between individual control modules may also be effected using a wireless link, e.g., a short range wireless radio communications bus. Individual devices may also be directly connected.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The powertrain system 100 is configured to operate in one of several states that can be described in terms of engine states including one of an engine-on state (ON) and an engine-off state (OFF), and transmission ranges including fixed gear modes, continuously variable (EVT) modes, and Neutral, described with reference to Table 1, below.

TABLE 1

| Description | Engine State | Transmission Range | Applied Clutches |
|---|---|---|---|
| Neutral | ON/OFF | Neutral | — |
| M1_Eng_Off | OFF | EVT Mode 1 | C1 70 |
| M1_Eng_On | ON | EVT Mode 1 | C1 70 |
| G1 | ON | Fixed Gear Ratio 1 | C1 70 C4 75 |
| G2 | ON | Fixed Gear Ratio 2 | C1 70 C2 62 |
| M2_Eng_Off | OFF | EVT Mode 2 | C2 62 |
| M2_Eng_On | ON | EVT Mode 2 | C2 62 |
| G3 | ON | Fixed Gear Ratio 3 | C2 62 C4 75 |
| G4 | ON | Fixed Gear Ratio 4 | C2 62 C3 73 |

The transmission ranges described in Table 1 indicate the specific applied one(s) of clutches C1 70, C2 62, C3 73, and C4 75 for each of the transmission ranges including fixed gear modes, EVT modes, and Neutral. The transmission 10 is described as a multi-mode electro-mechanical transmission because it is configured to operate in one of a plurality of EVT modes, including Mode 1 and Mode 2 in this embodiment. For purposes of this description, when the engine state is OFF, the engine input speed is equal to 0 RPM, i.e., the engine crankshaft is not rotating. A fixed gear operation provides a fixed ratio operation of input-to-output speed of the transmission 10. In response to operator input via the accelerator pedal 113, the brake pedal 112, and the transmission range selector 114, as captured by the user interface 13, the control module 5 determines torque commands to control the torque actuators including the engine 14 and the first and second torque machines 56 and 72 to meet the output torque request at the output member 64 for transference to the driveline 90.

Operation of the exemplary powertrain system 100 is deterministic, with torque commands, torque outputs and operating speeds determined based upon known torque commands, torque outputs and operating speeds. Deterministic relationships are established based upon the present transmission range, including one of the fixed gear mode, the EVT mode, and Neutral. Different transmission range equations are employed to describe the relationship based upon the transmission range.

The relationships associated with operating in one of the fixed gear ranges include transmission range equations describing a speed relationship, shown with reference to EQ. 1 and a torque relationship, shown with reference to EQ. 2. The speed relationship in the fixed gear mode is set forth below:

$$\begin{bmatrix} N_I \\ N_A \\ N_B \end{bmatrix} = \begin{bmatrix} A1 \\ A2 \\ A3 \end{bmatrix} N_O \quad [1]$$

wherein
$N_I$ is input speed of the input member 12,
$N_O$ is output speed of the output member 64,
$N_A$ is rotational speed of the first torque machine 56,
$N_B$ is rotational speed of the second torque machine 72, and
A1, A2, and A3 are application-specific and fixed gear mode-specific scalar values.

The torque relationship in the fixed gear mode is set forth below:

$$T_A = \begin{bmatrix} A4 & A5 & A6 & A7 \end{bmatrix} \begin{bmatrix} T_I \\ T_B \\ T_O \\ \dot{N}_I \end{bmatrix} \quad [2]$$

wherein
$T_A$ is torque command for the first torque machine 56,
$T_I$ is the input torque at the input member 12,
$T_B$ is torque command for the second torque machine 72,
$T_O$ is the output torque of the output member 64,
$\dot{N}_I$ is a time-rate change in the input speed $N_I$, and
A4-A7 are application-specific and fixed gear mode-specific scalar values.

The relationships associated with operating in one of the EVT modes include transmission range equations describing a speed relationship, shown with reference to EQ. 3 and a torque relationship, shown with reference to EQ. 4. The speed relationship in the EVT mode is set forth below:

$$\begin{bmatrix} N_A \\ N_B \end{bmatrix} = \begin{bmatrix} B1 & B2 \\ B3 & B4 \end{bmatrix} \begin{bmatrix} N_I \\ N_O \end{bmatrix} \quad [3]$$

wherein B1-B4 are application-specific and EVT mode-specific scalar values.

The torque relationship in the EVT mode is as follows:

$$\begin{bmatrix} T_A \\ T_B \end{bmatrix} = \begin{bmatrix} B5 & B6 & B7 & B8 \\ B9 & B10 & B11 & B12 \end{bmatrix} \begin{bmatrix} T_I \\ T_O \\ \dot{N}_I \\ \dot{N}_O \end{bmatrix} \quad [4]$$

wherein $\dot{N}_I$ is a time-rate change in the input speed $N_I$,
$\dot{N}_O$ is a time-rate change in the output speed $N_O$, and
B5-B12 are application-specific and EVT mode-specific scalar values.

The relationships associated with operating in Neutral include transmission range equations describing a speed relationship, shown with reference to EQ. 5 and a torque relationship, shown with reference to EQ. 6. The speed relationship in Neutral is set forth below:

$$\begin{bmatrix} N_A \\ N_B \end{bmatrix} = \begin{bmatrix} C1 & C2 & C3 \\ C4 & C5 & C6 \end{bmatrix} \begin{bmatrix} N_{C1} \\ N_I \\ N_O \end{bmatrix} \quad [5]$$

wherein
$N_{C1}$ is a speed of clutch C1 70, i.e., the clutch associated with operation in EVT Mode 1, and
C1-C6 are application-specific and Neutral range-specific scalar values.

The torque relationship in Neutral is set forth below:

$$\begin{bmatrix} T_A \\ T_B \\ T_O \end{bmatrix} = \begin{bmatrix} C7 & C8 & C9 & C10 \\ C11 & C12 & C13 & C14 \\ C15 & C16 & C17 & C18 \end{bmatrix} \begin{bmatrix} T_I \\ \dot{N}_I \\ \dot{N}_O \\ \dot{N}_{C1} \end{bmatrix} \quad [6]$$

wherein
$\dot{N}_{C1}$ is a time-rate change in the speed of clutch C1 associated with operation in EVT Mode 1, and
C7-C18 are application-specific and range-specific scalar values.

The powertrain system 100 employs the relationships of select pairs of EQS. 1-6 to control operation of the powertrain system 100, with torque commands and operating speeds determined in response to the aforementioned output torque request, taking into account the transmission range, including a selected one of the fixed gear mode, EVT mode, and Neutral.

Figure 2:
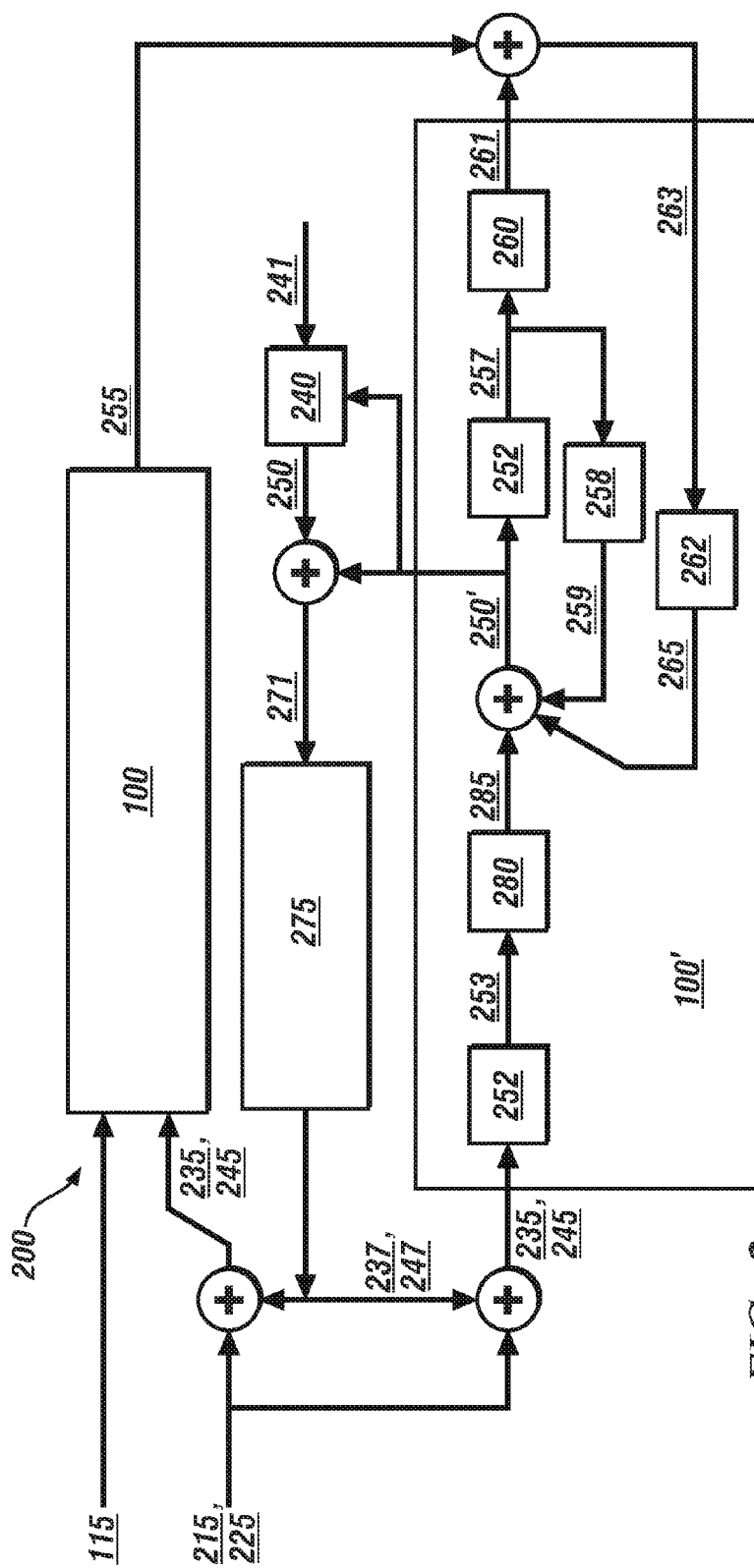
FIG. 2 illustrates a closed-loop speed control system configured to control operation of an embodiment of the multi-mode transmission, in accordance with the disclosure.

FIG. 2 schematically shows an embodiment of a closed-loop speed control system 200 that is configured to control operation of a powertrain system employing a multi-mode transmission, e.g., the powertrain system 100 described with reference to FIG. 1. The closed-loop speed control system 200 employs a feedback controller 275 to control the aforementioned powertrain system 100 with input from a powertrain system estimator 100'. Inputs to the closed-loop speed control system 200 include open-loop motor torque commands 215 and 225 for controlling the first and second torque machines 56 and 72 and an engine torque command 115 that are determined in response to the output torque request. The open-loop motor torque commands 215 and 225 are added to first and second torque errors 237 and 247 to determine a control vector that includes first and second final motor torque commands 235, 245, respectively, for controlling the first and second torque machines 56 and 72, respectively. This is an iterative process, with the closed-loop speed control system 200 and all the associated elements and control schemes executed during one of the aforementioned loop cycles to determine the control vector including the first and second final motor torque commands 235, 245 to control the first and second torque machines 56 and 72.

The estimator 100' is configured to predict various output states 250' based upon the control vector including the first and second final motor torque commands 235, 245 and a monitored state vector that includes a plurality of output states 255, which are delayed due to latencies in the system. The output states 255 preferably include select transmission speed states, including by way of example, the input speed $N_I$, output speed $N_O$ or wheel speed $N_W$, and first and second motor speeds $N_A$ and $N_B$. The output states 255 may also include select transmission torque states, including by way of example clutch torques of applied torque transfer clutches. The estimator 100' monitors the control vector including the first and second final motor torque commands 235, 245 and the output states 255.

The control vector passes through a cycle delay 252 to generate a delayed control vector 253 that is input to a controller 280 to calculate a plurality of expected transmission operating states 285 in response thereto. The controller 280 executes selected pairs of EQS. 1-6 associated with the selected transmission range to determine the expected transmission operating states 285 in response to the delayed control vector 253, and the expected transmission operating states 285 include expected states for the input speed $N_I$, the output speed $N_O$, and the first and second motor speeds $N_A$ and $N_B$. The expected output states 285 are arithmetically combined with first feedback states 259 and estimation correction output states 265 to determine the estimated output states 250'.

The estimated output states 250' pass through another cycle delay 252 to determine delayed estimated various powertrain states 257, which are input to a feedback loop including a proportional/integral controller 258 to determine the first feedback states 259. The delayed estimated various powertrain states 257 are input to a second feedback loop with proportional/integral controller 260 to determine second feedback states 261, which are subtracted from the output states 255 to determine estimation errors 263. The estimation errors 263 are input to an estimation controller 262 to determine the estimation correction output states 265. Furthermore, the estimated output states 250' and a plurality of input profiles 241 are input to a state reference scheme 240 to calculate or otherwise determine a plurality of reference states 250. The input profiles 241 include time-based estimates of upcoming engine speeds and accelerations that may be determined based upon present operating conditions that account for latencies associated with the control system of the engine.

Operation of the powertrain system 100 includes closed-loop speed control that may employ active driveline damping control. The preferred operating parameters include a control signal, e.g., a torque command, and a response signal, e.g., rotational speed, for each of the torque machines, e.g., the first and second torque machines 56 and 72. The reference states 250 include reference states for the output speed ($N_{o\_ref}$), the input or engine speed ($N_{e\_ref}$), and motor speeds for the first torque machine ($N_{a\_ref}$) and the second torque machine ($N_{b\_ref}$). The reference output speed ($N_{o\_ref}$) is related to wheel speed of the vehicle wheels 93, with the wheel speed including an estimated wheel speed ($N_{w\_est}$) as follows.

$$N_{o\_ref} = N_{w\_est} * \text{final drive ratio} \quad [7]$$

The reference speeds can be determined as follows, depending upon the selected one of the transmission ranges including fixed gear mode, EVT mode, and Neutral, employing three sets of independent equations, with the K values, i.e. ratios, selected for the specific transmission range.

Thus, when operating in Neutral, the reference speeds are determined in accordance with the following relationship:

$$N_{e\_ref} = N_{i\_profile}$$

$$N_{a\_ref} = K_{i\_to\_a} * N_{i\_profile} + K_{c\#\_to\_a} * N_{c\#\_profile} + K_{o\_to\_a} * N_{o\_ref}$$

$$N_{b\_ref} = K_{i\_to\_b} * N_{i\_profile} + K_{c\#\_to\_b} * N_{c\#\_profile} + K_{o\_to\_b} * N_{o\_ref} \quad [8]$$

wherein $K_{i\_to\_a}$ and $K_{i\_to\_b}$ represent application-specific scalar values associated with the relation between the input member 12 and Motors A and B, respectively, for the selected transmission range, $K_{c\#\_to\_a}$ and $K_{c\#\_to\_b}$ represent application-specific scalar values associated with the relation between a selected clutch, e.g., clutch C1 and Motors A and B, respectively, for the selected transmission range, $K_{o\_to\_a}$ and $K_{o\_to\_b}$ represent application-specific scalar values associated with the relation between the output member 64 and Motors A and B, respectively, for the selected transmission range, $N_{i\_profile}$ is an input speed profile, which indicates an expected time-rate change in the input speed associated with operation of the engine 14, and $N_{c\#\_profile}$ is a clutch speed profile, which indicates an expected time-rate change in the selected clutch, e.g., clutch C1.

When operating in one of the EVT modes, the reference speeds are determined in accordance with the following relationship.

$$N_{e\_ref} = N_{i\_profile}$$

$$N_{a\_ref} = K_{i\_to\_a} * N_{i\_profile} + K_{o\_to\_a} * N_{o\_ref}$$

$$N_{b\_ref} = K_{i\_to\_b} * N_{i\_profile} + K_{o\_to\_b} * N_{o\_ref} \quad [9]$$

When operating in one of the fixed gear modes, the reference speeds are determined in accordance with the following relationship.

$$N_{e\_ref} = K_{o\_to\_e} * N_{o\_ref}$$

$$N_{a\_ref} = K_{o\_to\_a} * N_{o\_ref}$$

$$N_{b\_ref} = K_{o\_to\_b} * N_{o\_ref} \quad [10]$$

Thus, the output speed ($N_{o\_ref}$) is employed to determine each of the reference speeds used in the feedback controller 275 to control the powertrain system 100 with input from the powertrain system estimator 100'. The estimated output states 250' are compared to the reference output states 250 to determine speed control errors 271, which are employed by the feedback controller 275 to determine first and second torque errors 237 and 247, respectively. When there is inaccuracy in the reference output speed ($N_{o\_ref}$), the related reference speeds including the input or engine speed ($N_{e\_ref}$), and motor speeds for the first torque machine ($N_{a\_ref}$) and the second torque machine ($N_{b\_ref}$) are inaccurate, and thus the speed control errors 271 are inaccurate.

Figure 3:
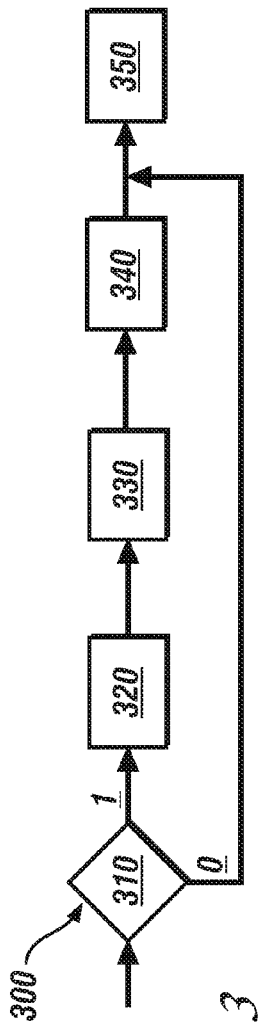
FIG. 3 illustrates a control scheme to operate an embodiment of the powertrain system including operation in response to detecting a stuck clutch in accordance with the disclosure.

FIG. 3 depicts operation of a control scheme 300 to operate an embodiment of the powertrain system 100 described with reference to FIG. 1, including operation in response to detecting a stuck-closed clutch. The preferred operating parameters include a control signal, e.g., a torque command, and a response signal, e.g., rotational speed, for each of the torque machines, e.g., the first and second torque machines 56 and 72. Table 2 is provided as a key for the control scheme 300 wherein the numerically labeled blocks and the corresponding functions are set forth as follows.

TABLE 2

| BLOCK | BLOCK CONTENTS |
|---|---|
| 310 | Monitor clutch activation; Is a stuck-closed clutch flag set? |
| 320 | Identify stuck-closed clutch and any applied clutch(es) |
| 330 | Include stuck-closed clutch as one of the applied clutches |
| 340 | Convert selected transmission range equations to equations associated with applied clutches including the stuck-closed clutch |
| 350 | Control operation of the powertrain system employing the closed-loop speed control system. |

During ongoing operation, the control scheme 300 monitors operation of the transmission, including monitoring clutch activation to determine whether a stuck-closed clutch flag is set (310). A stuck-closed clutch flag may be set by monitoring clutch activation to identify the applied clutches, and comparing the identified applied clutch to the expected applied clutch(es), if any, which can be determined with reference to the commanded transmission range shown in Table 1.

When a stuck-closed clutch flag is not set (0), operation of the powertrain system 100 is controlled in the present transmission range including employing the aforementioned closed-loop speed control system 200 to determine torque commands for the first and second electric machines 56 and 72 (350). When a stuck-closed clutch flag is set (1), the stuck-closed clutch and other applied clutch(es), if any, are identified (320). The control scheme 300 includes the stuck-closed clutch as one of the applied clutches (330).

The control scheme 300 converts the operation of the closed-loop speed control system 200 to employ selected transmission range equations that are associated with the applied clutches identified in the previous step (340). This includes employing the selected transmission range equations in the controller 280 of estimator 100' as part of the control scheme 200. The feedback controller 275 executes the selected transmission range equations using the speed control errors 271 to determine first and second torque errors 237 and 247, respectively, wherein the speed control errors 271 are a difference between the estimated output states 250' and the reference output states 250. Operation of the powertrain system 100 is controlled employing the selected transmission range equations in the closed-loop speed control system 200 (350).

Figure 4:
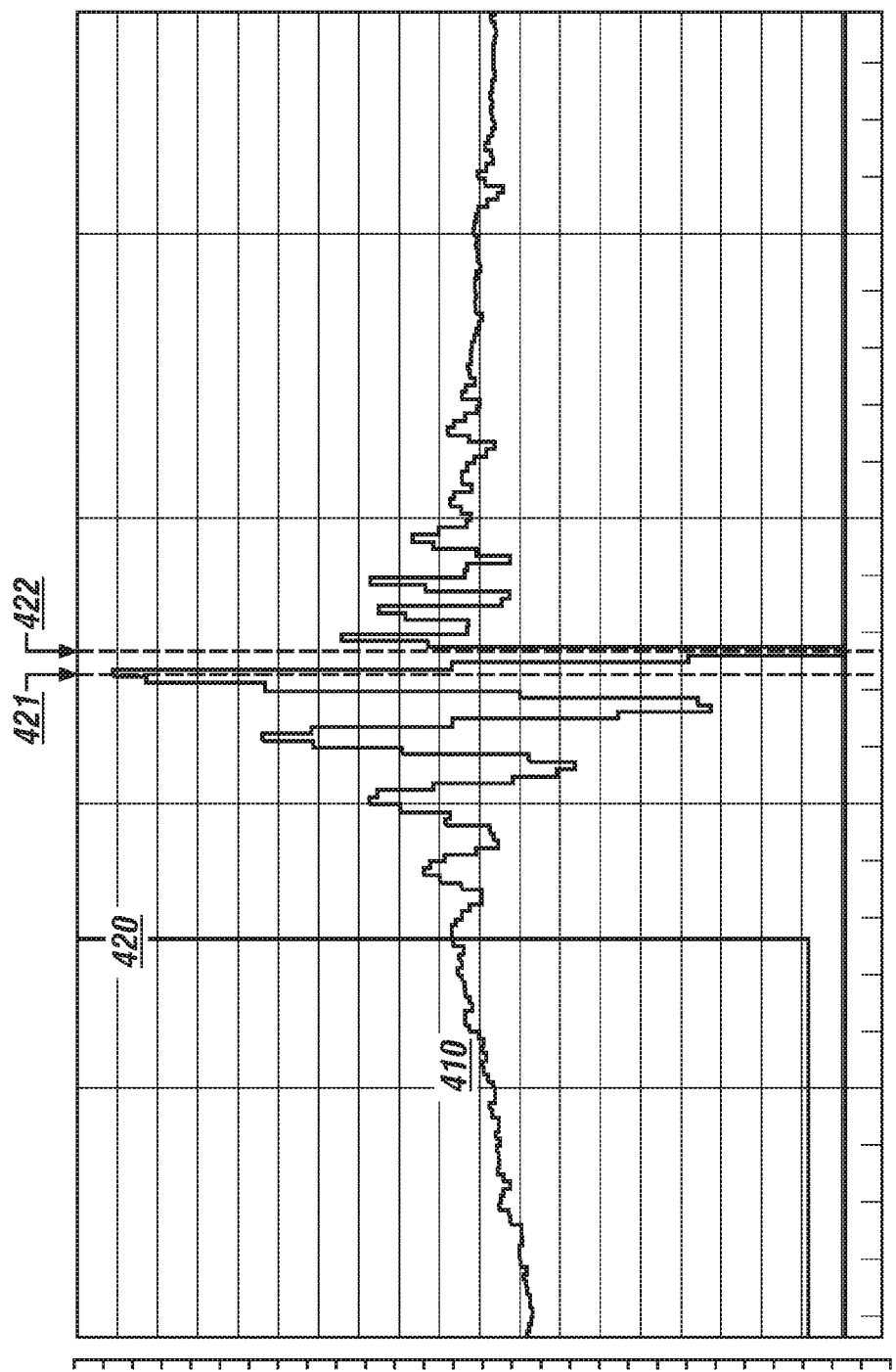
FIG. 4 illustrates transmission output speed in relation to elapsed time for an embodiment of the powertrain system employing the closed-loop control scheme but without employing the stuck clutch detection control scheme in accordance with the disclosure.

FIG. 4 graphically shows transmission output speed 410 in relation to elapsed time for an embodiment of the powertrain system 100 described with reference to FIG. 1 with the closed-loop control scheme 200 described with reference to FIG. 2 but without use of the stuck-closed clutch detection control scheme 300 described with reference to FIG. 3. At time point 420 a stuck-closed clutch is indicated. The estimator 100' of the control scheme 200 executes control equations that are consistent with an understanding that the powertrain system 100 is operating in Neutral, whereas the powertrain system 100 is actually operating in Mode 1 due to clutch C1 being stuck-closed. Therefore, the control scheme 200 is unable to damp out the oscillations. The results indicated speed oscillations on the output of the transmission, which reach about 500 RPM in amplitude as indicated by a difference in amplitude between a maximum speed indicated at time point 421 and a minimum speed indicated at time point 422.

Figure 5:
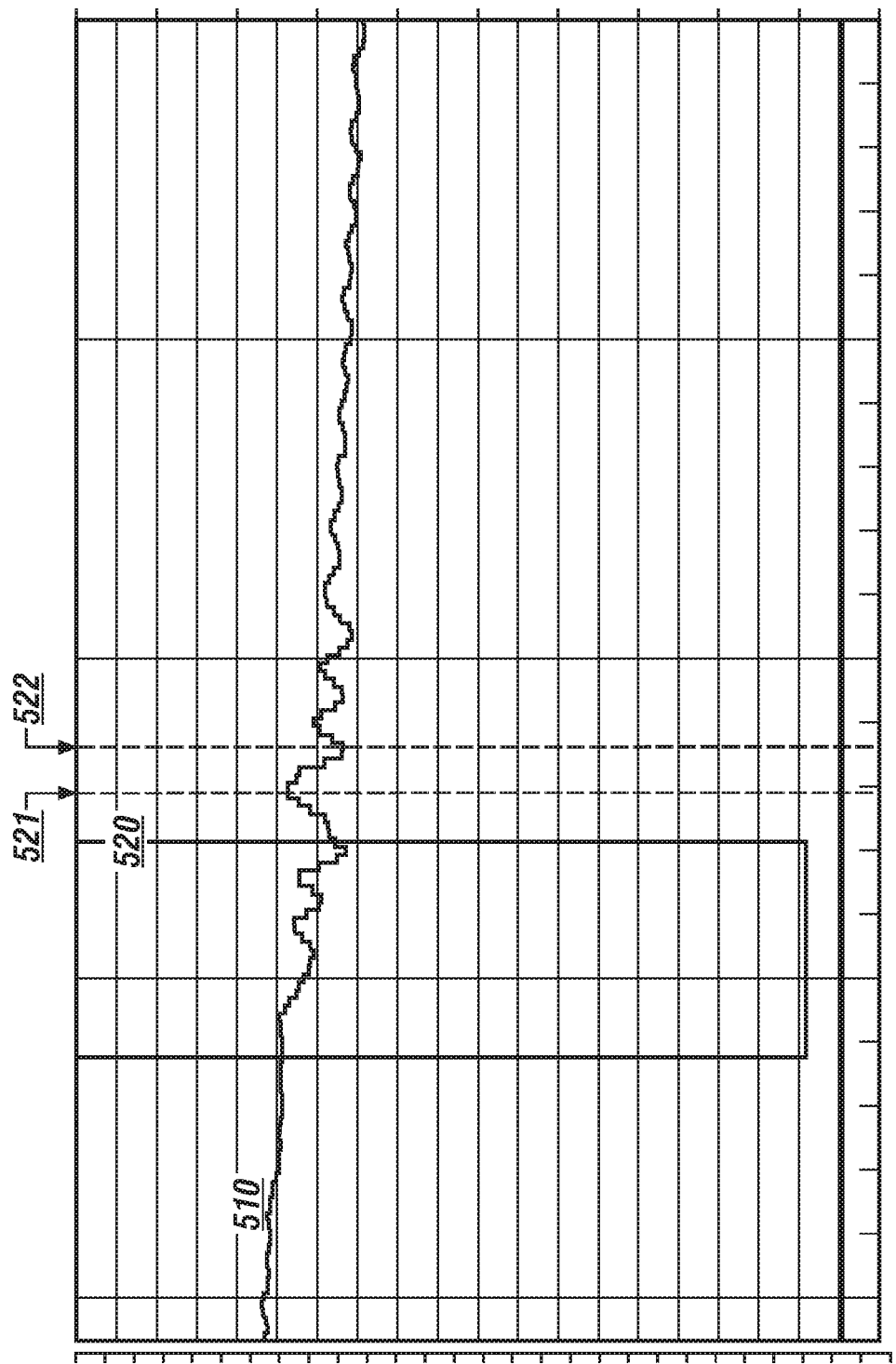
FIG. 5 illustrates transmission output speed in relation to elapsed time for an embodiment of the powertrain system employing the closed-loop control scheme and the stuck clutch detection control scheme in accordance with the disclosure.

FIG. 5 graphically shows transmission output speed 510 in relation to elapsed time for an embodiment of the powertrain system 100 described with reference to FIG. 1 with the closed-loop control scheme 200 described with reference to FIG. 2 and employing the stuck-closed clutch detection control scheme 300 described with reference to FIG. 3. At time point 420 a stuck-closed clutch is indicated. The estimator 100' of the control scheme 200 executes control equations that are consistent with an understanding that the powertrain system 100 is operating in Mode 1 due to clutch C1 70 being stuck-closed. Therefore, the control scheme 200 is able to damp out the oscillations properly. The results indicated speed oscillations on the output of the transmission which reach about 40 RPM as indicated by a difference in amplitude between a maximum speed indicated at time point 521 and a minimum speed indicated at time point 522. The system described herein improves response of the powertrain system including operations for closed-loop speed control by changing the state used for selecting estimator equations for speed control based on information indicating presence of a stuck-closed clutch. This action permits the aforementioned estimator to correctly estimate speeds providing improved drivability under clutch fault conditions.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for controlling a powertrain system comprising a multi-mode transmission including a plurality of torque-transfer clutches, comprising:
    upon detecting one of the torque-transfer clutches is in a stuck-closed condition, employing a closed-loop system to control operation of the multi-mode transmission, comprising:
        identifying all presently applied clutches including commanded applied clutches and the stuck-closed clutch;
        monitoring adjusted open-loop torque commands and delayed speed states from a previous iteration;
        selecting transmission range equations associated with the presently applied clutches, wherein each of the selected transmission range equations correspond to a respective operating range state of the multi-mode transmission;
        executing the selected transmission range equations to estimate speed states for the multi-mode transmission based on the adjusted open-loop torque commands and delayed speed states from the previous iteration;
        determining torque errors based upon said estimated speed states for the multi-mode transmission; and
        adjusting open-loop motor torque commands with the torque errors.

2. The method of claim 1, wherein determining torque errors based upon said estimated speed states for the multi-mode transmission comprises:
    determining reference speed states for the multi-mode transmission based upon the estimated speed states and a plurality of input profiles;
    determining speed control errors based upon a difference between the reference speed states and the estimated speed states; and
    executing the selected transmission range equations to determine the torque errors based upon the speed control errors.

3. The method of claim 1, wherein adjusting open-loop motor torque commands with the torque errors comprises adjusting open-loop motor torque commands to control torque outputs of a plurality of torque machines coupled to the multi-mode transmission.

4. A method for controlling a powertrain system comprising a multi-mode transmission including a plurality of torque-transfer clutches and torque machines, comprising:
    upon detecting one of the torque-transfer clutches is in a stuck-closed condition, controlling torque outputs of the torque machines accounting for all the presently applied clutches, comprising:
        identifying all presently applied clutches including commanded applied clutches and the stuck-closed clutch;
        monitoring adjusted open-loop torque commands and delayed speed states from a previous iteration;
        selecting transmission range equations associated with the presently applied clutches, wherein each of the selected transmission range equations correspond to a respective operating range state of the multi-mode transmission;
        executing the selected transmission range equations to estimate speed states for the multi-mode transmission based on the adjusted open-loop torque commands and delayed speed states from the previous iteration;
        determining torque errors based upon said estimated speed states for the multi-mode transmission; and
        adjusting open-loop motor torque commands with torque errors.

5. The method of claim 4, wherein determining torque errors based upon said estimated speed states for the multi-mode transmission comprises:
    determining reference speed states for the multi-mode transmission based upon the estimated speed states and a plurality of input speed profiles;
    determining speed control errors based upon a difference between the reference speed states and the estimated speed states; and
    executing the selected transmission range equations to determine the torque errors based upon the speed control errors.

6. The method of claim 4, wherein adjusting open-loop motor torque commands with the torque errors comprises adjusting open-loop motor torque commands to control torque outputs of the torque machines.

7. A method for controlling a powertrain system comprising a multi-mode transmission including a plurality of torque-transfer clutches, comprising:
    upon detecting one of the torque-transfer clutches is in a stuck-closed condition, employing a closed-loop speed control system to control operation of the multi-mode transmission including accounting for all presently applied clutches, comprising:
        identifying all presently applied clutches including commanded applied clutches and the stuck-closed clutch;
        monitoring adjusted open-loop torque commands and delayed speed states from a previous iteration;
        determining speed control errors based upon a difference between estimated speed states for the multi-mode transmission and reference speed states for the multi-mode transmission;

selecting transmission range equations associated with the presently applied clutches wherein each of the selected transmission range equations corresponds to a respective operating range state of the multi-mode transmission;

executing the closed-loop speed control system including employing the selected transmission range equations to estimate speed states for the multi-mode transmission based on the adjusted open-loop torque commands and delayed speed states from the previous iteration;

determining torque errors based upon said estimated speed states for the multi-mode transmission; and employing the torque errors to control operation of the multi-mode transmission.

8. The method of claim 7, wherein employing the torque errors to control operation of the multi-mode transmission comprises employing the torque errors to adjust open-loop motor torque commands for controlling torque machines configured to transfer torque to the multi-mode transmission.

* * * * *